United States Patent [19]

Hackbarth

[11] 3,911,870
[45] Oct. 14, 1975

[54] UPPER CRANKSHAFT BEARING LUBRICATION

[75] Inventor: Eugene R. Hackbarth, Kenosha, Wis.

[73] Assignee: Outboard Marine Corporation, Waukegan, Ill.

[22] Filed: Feb. 22, 1974

[21] Appl. No.: 444,846

[52] U.S. Cl. ........ 123/8.01; 123/196 W; 123/DIG. 5; 418/98; 418/100
[51] Int. Cl.[2] .......................................... F02B 53/00
[58] Field of Search........ 123/8.01, 196 W, 196 CP, 123/DIG. 5, 196 R; 418/98, 97, 99, 100; 184/15 R

[56] References Cited
UNITED STATES PATENTS

| | | | |
|---|---|---|---|
| 1,465,885 | 8/1923 | Wege | 123/DIG. 5 |
| 1,764,712 | 6/1930 | Brackett et al. | 417/439 |
| 2,459,594 | 1/1949 | Smith | 123/196 W |
| 2,598,147 | 5/1952 | Tescher | 123/DIG. 5 |
| 3,180,323 | 4/1965 | Paschke | 123/8.01 |
| 3,424,135 | 1/1969 | Tado | 418/100 |
| 3,523,592 | 8/1970 | Fenton | 123/196 R |
| 3,811,806 | 5/1974 | King | 123/8.01 |

Primary Examiner—C. J. Husar
Assistant Examiner—O. T. Sessions
Attorney, Agent, or Firm—Michael, Best & Freidrich

[57] ABSTRACT

Disclosed herein is an engine having upper and lower crankshaft bearings and a chamber subject to cyclical pressure variation in response to engine operation, together with a conduit communicating between the upper and lower bearings and including an intermediate portion, a first one-way valve located between the upper bearing and the intermediate conduit portion for permitting flow from the intermediate conduit portion to the upper bearing and for preventing flow from the upper bearing to the intermediate conduit portion, a second one-way valve located between the intermediate conduit portion and the lower crankshaft bearing for permitting flow from the lower crankshaft bearing to the intermediate conduit portion and for preventing flow from the intermediate conduit portion to the lower crankshaft bearing, and a duct communicating between the chamber in which cyclical pressure variation occurs and the intermediate conduit portion between the one-way valves so as thereby to cyclically pressurize the intermediate conduit portion so as to pump liquid from the lower bearing to the upper bearing.

4 Claims, 2 Drawing Figures

UPPER CRANKSHAFT BEARING LUBRICATION

BACKGROUND OF THE INVENTION

The invention relates generally to internal combustion engines including a crankshaft which extends vertically and is supported by upper and lower bearings. It is common in such constructions for lubricating oil or "drains" to accumulate in the engine. However, in previous constructions, no provision has been made for using such "drains" to lubricate both the upper and lower crankshaft bearings.

Attention is directed to the U.S. Heidner Pat. No. 3,132,635, issued May 12, 1964 and to the U.S. Pipes Pat. No. 3,765,393, issued Oct. 16, 1973.

SUMMARY OF THE INVENTION

The invention provides an internal combustion engine defining a chamber in which cyclical pressure variation occurs and having upper and lower crankshaft bearings supporting a vertically extending crankshaft, together with a conduit or duct which includes a central or intermediate portion constituting a reservoir, and which communicates, at one end, with the upper bearing and which communicates, at the other end, with a sump which is arranged to collect engine drains and which preferably houses the lower crankshaft bearing.

In further accordance with the invention, the conduit includes a first one-day valve located between the intermediate conduit portion and the sump or lower crankshaft bearing to permit flow of "drains" from the sump or lower crankshaft bearing to the intermediate conduit portion and to prevent flow of "drains" from the intermediate conduit portion to the sump or lower crankshaft bearing.

In addition, the conduit includes a second one-way valve located between the upper bearing and the intermediate conduit portion for permitting flow of "drains" from the intermediate conduit portion to the upper bearing and for preventing flow of "drains" from the upper bearing to the intermediate conduit portion.

In further accordance with the invention, the intermediate or central portion of the conduit communicates through a passage with an engine part or chamber which experiences cyclical pressure variation above and below the pressure condition which otherwise would exist in the central or intermediate conduit portion. Thus, the cyclical pressure variation in the engine part serves to pump "drains" from the sump or lower crankshaft bearing to the upper crankshaft bearing.

One of the principal features of the invention is the provision of an internal combustion engine including means actuated by cyclical pressure variation in the engine for pumping lubricating oil from a "drains" sump or lower crankshaft bearing to an upper crankshaft bearing.

Another of the principal features of the invention is a provision of an arrangement for automatically lubricating the upper bearing of a vertically arranged crankshaft in response to cyclical pressure variation occurring incident to engine operation.

Still another feature of the invention is the provision of an upper crankshaft bearing lubrication system in an internal combustion engine arranged with a vertically extending crankshaft.

Other objects and advantages of the invention will become apparent from the following drawings, general description, and claims.

THE DRAWINGS

GENERAL DESCRIPTION

Figure 2:
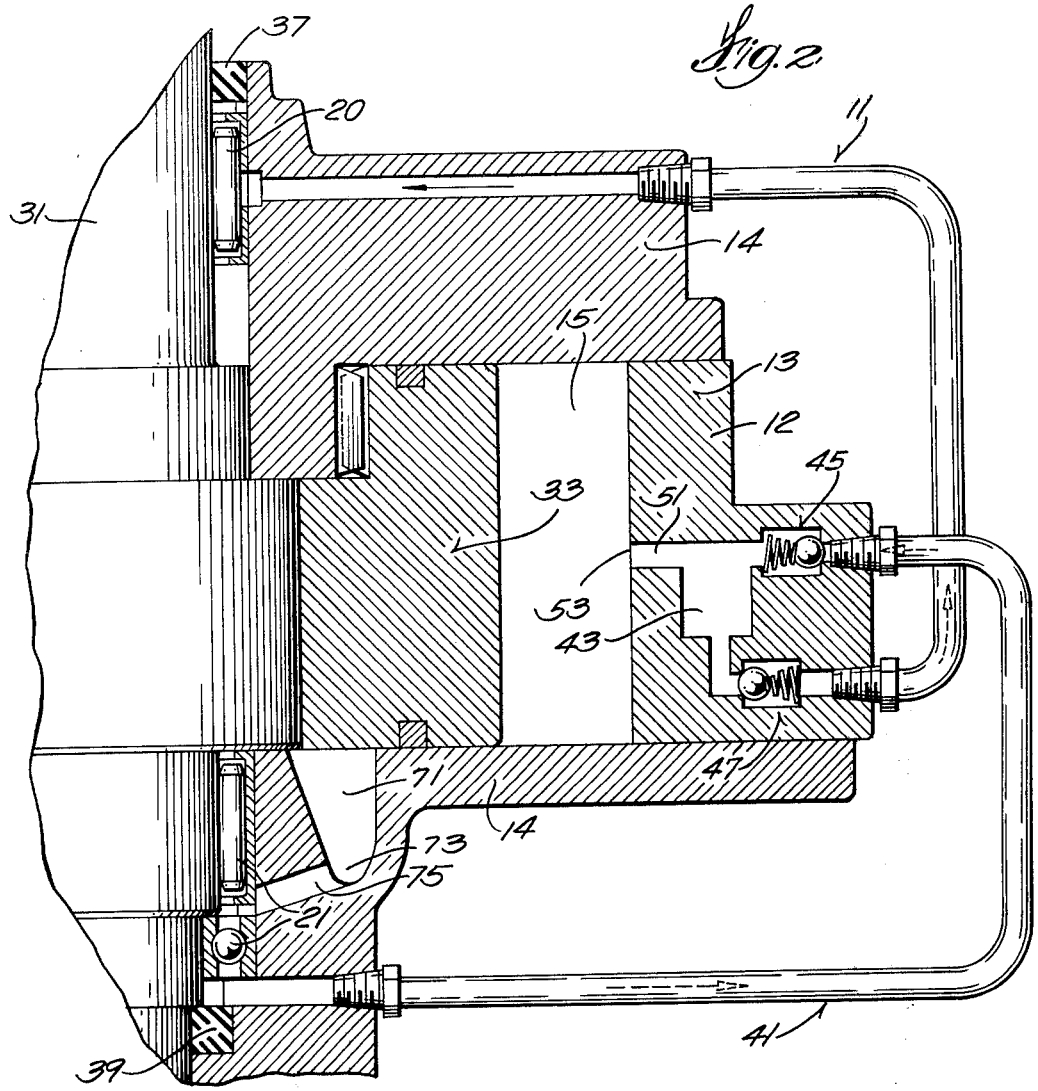
FIG. 2 is an enlarged, fragmentary and partially schematic cross sectional view of the engine shown in FIG. 1.
Figure 1:
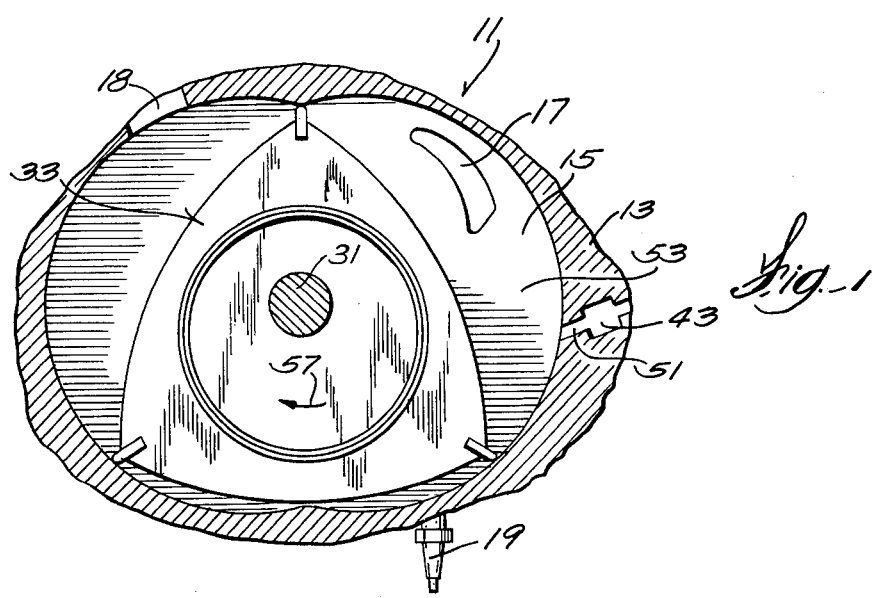
FIG. 1 is a fragmentary and partially schematic view of a rotary internal combustion engine embodying various of the features of the invention.

Shown schematically in the drawings is a rotary internal combustion engine 11 which includes an engine assembly or block 13 defining a substantially closed rotor cavity or chamber 15 which is subject to cyclical pressure variation in response to engine operation and which communicates with a fuel inlet port 17, an exhaust gas outlet port 18, and a spark plug 19. The block 13 includes a rotor housing 12 and connected end walls or covers 14. Provided in the assembly or block 13 are upper and lower crankshaft bearings 20 and 21 which rotatably support a vertically arranged crankshaft 31 which, in turn, supports a rotor 33 for rotation relative to the crankshaft 31 and relative to and within the cavity 15 and about an axis located in eccentric relation to the crankshaft axes so as to produce a cyclical pressure variation in the rotor chamber 15. Upper and lower seals 37 and 39 are provided around the crankshaft 31 axially outwardly of the upper and lower crankshaft bearings 20 and 21. Preferably, the assembly or block 13 is arranged in the area of the lower crankshaft bearing 21 so as to form a sump means and to cause "drains" or lubricant to accumulate in the sump in the area of the lower crankshaft bearing 21 and thereby to lubricate the lower bearing 21.

In still further accordance with the invention, there is provided a conduit or passage 41 which communicates between the upper and lower bearings 20 and 21 to accommodate flow of lubricant or "drains" from the lower bearing 21 to the upper bearing 20. Any suitable construction for providing the passage 41 can be employed, either within the engine assembly or block 13 or, in part, outside of the engine assembly block 13.

In still further accordance with the invention, the conduit or passage 41 includes a central portion or reservoir 43 into which "drains" can be pumped from the lower bearing 21, as will hereinafter be explained. Alternatively, the reservoir 43 could be arranged for gravity flow thereto of "drains" flowing in the conduit 41. The conduit 41 also includes first one-way valve means 45 located between the lower bearing 21 and the intermediate conduit portion or reservoir 43 and operable to permit flow of "drains" from the lower crankshaft bearing 21 to the intermediate conduit portion 43 and to prevent flow from the intermediate conduit portion 43 to the lower crankshaft bearing 21.

Also included in the conduit 41 is second one-way valve means 47 located between the central conduit portion 43 and the upper bearing 20 and operable to permit flow from the intermediate conduit portion 43 to the upper bearing 20 and to prevent flow from the upper bearing 20 to the intermediate conduit portion 43. Any suitable construction can be employed for the valve means 45 and 47.

In still further accordance with the invention, there is provided a duct 51 which communicates between the rotor chamber 15 and the intermediate conduit portion or reservoir 43 so as to subject the lubricant or "drains" in the intermediate conduit portion 43 to the cyclical pressure variation occurring in the rotor chamber 15 in the vicinity of the duct 51. As a result, the lubricant or "drains" are pumped from the lower crankshaft bearing 21 into the reservoir or central conduit portion 43 during periods of relatively low or negative pressure within the rotor chamber 15 in the area of the duct 51 and lubricant or "drains" are pumped from the central conduit portion 43 through the conduit 41 to the upper crankshaft bearing 20 during periods of relatively high pressure within the rotor chamber 15 in the vicinity of the duct 51. Accordingly, lubricant or "drains" is pumped from the lower bearing 21 to the upper bearing 20.

While other specific arrangements could be employed, in the illustrated construction, the duct 51 communicates with a portion 53 of the rotor chamber 15 located approximately halfway between the spark plug 19 and the fuel inlet port 17. As a consequence, and during rotation of the rotor 33 in the clockwise direction as indicated by the arrow 57, the pressure within the chamber portion 53 in the vicinity of the duct 51 is relatively negative immediately after passage past the duct of a first rotor apex portion and during fuel inlet or suction into the rotor cavity or chamber 15. After the next or second rotor apex portion closes the inlet port 17, the pressure in the portion 53 of the rotor chamber 15 in the vicinity of the duct 51 then increases until passage past the duct 51 of the next or second rotor apex portion.

As already indicated, the engine block or assembly 13 (including the lower end or cover plate 14) can be arranged to cause "drains" to flow to a sump or lower bearing 21. In the illustrated construction, the lower cover 14 is formed (See FIG. 2) with a fuel inlet passage 71 which communicates with the fuel inlet port 17 and which includes a sump portion 73 in which "drains" accumulate. The fuel inlet passage sump portion 73 communicates through a passageway 75 with the lower crankshaft bearing 21 so as to cause gravity flow of "drains" from the fuel inlet passage 71 to the lower crankshaft bearing 21.

While the invention has been disclosed in connection with a rotary internal combustion engine 11 having a rotor chamber 15 in which cyclical pressure variation occurs, it is to be understood that the invention is not so limited and is applicable to any internal combustion engine which includes a portion subject to cyclical pressure variation which can be applied to a central conduit portion or reservoir 43 in order to effect pumping of lubricant or "drains" from the lower crankshaft bearing 21 or other sump to the upper crankshaft bearing 20.

Various of the features of the invention are set forth in the following claims.

What is claimed is:

1. An engine having upper and lower crankshaft bearings, means defining a chamber subject to cyclical pressure variation in response to engine operation, a sump for accumulating "drains" from the engine, a conduit communicating between said upper bearing and said sump including an intermediate portion, a first one-way valve means located between said upper bearing and said intermediate conduit portion for permitting flow from said intermediate conduit portion to said upper bearing and for preventing flow from said upper bearing to said intermediate conduit portion, a second one-way valve means located between said intermediate conduit portion and said sump for permitting flow from said sump to said intermediate conduit portion and for preventing flow from said intermediate conduit portion to said sump, and duct means communicating between said chamber and said intermediate conduit portion between said one-way valve means for cyclically pressurizing said intermediate conduit portion so as to pump liquid from said sump to said intermediate portion during a condition of relatively low pressure in said chamber and said intermediate portion and to pump liquid from said intermediate portion to said upper bearing during a condition of relatively high pressure in said chamber and said intermediate portion.

2. An engine in accordance with claim 1 wherein said lower crankshaft bearing is located in said sump.

3. An engine in accordance with claim 1 and wherein said chamber comprises a rotor cavity and further including a fuel inlet port communicating with said cavity and a spark plug communicating with said cavity, and wherein said duct communicates with said rotor cavity in the area between said spark plug and said fuel inlet port.

4. An engine in accordance with claim 1 wherein said engine includes wall means for directing gravity flow of "drains" toward said lower bearing.

* * * * *